UNITED STATES PATENT OFFICE.

EDWARD O. BENJAMIN, OF NEWARK, NEW JERSEY.

RUBBER PRODUCTS AND METHOD OF MAKING THE SAME.

1,409,275.               Specification of Letters Patent.     Patented Mar. 14, 1922.

No Drawing.       Application filed June 26, 1918. Serial No. 242,047.

*To all whom it may concern:*

Be it known that I, EDWARD O. BENJAMIN, a citizen of the United States, and resident of Newark, in the county of Essex and State of New Jersey, have invented certain new and useful Improvements in Rubber Products and Methods of Making the Same, of which the following is a specification.

My present invention relates to rubber compounds of the type adapted to be molded, pressed or rolled in the form of sheets or articles of various kinds.

One of the objects is the production of a variety of materials particularly adapted to withstand the action of the natural elements, heat, electricity, alkalies, acids and such active chemicals as are ordinarily destructive to rubber and rubber compounds or substitutes.

My products are of such composition that when exposed to the action of ordinarily destructive chemicals such as alkalies, acids and the like, the chemical action results in forming a thin film of protective coating on the surface of the article, probably, by reacting with some of the constituents thereof.

The invention includes a raw binding material and methods of mixing it, combining it with filler and combining the binder constituents to make the various novel products.

The binding materials and the binder and filler made in accordance with my invention may be molded and, by slight variations in the proportion of the ingredients or the lapse of time in the process of heat treatment, the products may be made to have a degree of hardness or mechanical rigidity sufficient for structural or mechanical purposes, as for instance, holding different parts of an apparatus in proper structural or mechanical relation. In certain cases, the material may be compounded in such proportions and the heat treatment made such as to bring about a degree of hardness rendering the product suitable for machining. In such case the material may be shaped or molded in blocks, bars or rods adapted for machine or hand working or it may be molded into approximate final form, as for instance, in slabs to be used in place of slate or marble for electrical switches or switch boards.

My invention also includes making tough, pliable materials which by easily controlled variations of composition or method, can be made of different degrees of flexibility, toughness and wear-resisting qualities, thereby making possible a great variety of novel products such as are now made from filled rubber or partly vulcanized rubber and various rubber substitutes.

For certain purposes, the raw binding material may be dissolved in a suitable solvent and applied as a paint, or as a coating for cloth, leather, paper, etc., the solvent then being permitted to evaporate. The dried or partly dried material may be then heat-treated as hereafter explained. The material forms an effective protection when thus coated on articles subject to the action of chemicals.

My success in attaining the above objects results from my discovery of how to effect various chemical combinations of rubber or its equivalent with desirable classes of substances, particularly condensation products in primary or soluble and reactive form, in the presence of sulphur or its equivalent, and also from my discovery of how to do this in such manner as to successfully incorporate, physically hold together, and chemically protect considerable quantities of inert filler. The condensation products may be those derived by reaction of phenol or any of its homologues with formaldehyde or its polymers or hydrates, but of these I prefer the cresol-formaldehyde products.

The various phenols when heated with formaldehyde in the presence or absence of catalysts (ammonia, etc.), readily react to form new bodies. As the action is one of a type chemically known as condensation, the new bodies are called condensation products. In the early stages of action the products are soft and viscous or gummy materials but as it goes on they become harder and higher-melting, finally becoming hard resins, insoluble in most solvents and of highly inert character toward all chemical materials. These final products are sometimes called heat-hardening resins, since the action of heat on them is to cause them to become harder and less fusible. It is presumed that the phenol and aldehyde first combine together to form various primary reaction products and these then react with each other to form complex bodies of high molecular weight; the inert resins mentioned.

I have found that these reaction products in their primary, highly reactive condition are useful agents for incorporation in rubber. When so incorporated, the amount of sulphur ordinarily employed for vulcanizing, which is usually several times that required for chemical combination with the rubber to reach the stage of vulcanization wished, can be cut down to about that which is necessary. The rubber compounded with these reactive condensation products also has a number of desirable properties, as hereinafter set forth. The condensation product may be uniformly intermingled with the rubber-sulphur mixture by dissolving or softening each in appropriate solvents and then mixing; or the condensation product may be introduced as film coating on inert carrier particles; thereby giving a large area of contact between rubber and condensation product with a relatively small amount of the latter.

In operating in the latter embodiment of my method, that is by spreading out the condensation product as a film coating, I may proceed as follows. A suitable inert carrier material of fine particled character, which may be any of the ordinary materials used as fillers in rubber, is first film coated with primary condensation product. The coated particles of carrier material may be called nuclei for the actions intended to take place. The rubber is separately mixed with the sulphur very thoroughly, preferably by milling and rolling. The coated material finely comminuted and in dry form, is then intimately mixed with the rubber-sulphur mixture to form a binding material. This binding material is then thoroughly mixed with a suitable quantity of inert filler preferably by repeated rolling and folding operations. The resulting homogeneous mixture may be molded into any desired form and the molded article may be heated under a pressure to a temperature and for a time necessary to produce the desired reaction and combination of the materials. These will vary somewhat according to the proportions of the several ingredients.

The inert material, the particles of which are to form the nuclei or carrier for the coating, is preferably asbestos, mica, talc or other similar material and the condensation product is preferably one obtained by the reaction of cresol and formaldehyde to form a condensation product in one of its primary or more sensitive states and before reaching the infusible, insoluble state. The rubber constituent may be rubber, balata or gutta percha. The additional filling material to be mixed with the coated nuclei and rubber may be such inert substances as asbestos, mica, talc, etc. For steam packing or other purposes where insulation is unnecessary or where conductivity is desired, graphite or aluminum powder may be used for nuclei or filler, or both.

In making insulating material the asbestos, mica, talc or similar material may be used for the nuclei and for the filler, but where very high insulating quality is desired, I prefer pure, short fibre asbestos for the nuclei and clina mica for the filler; and while various kinds of rubber may be employed, I prefer standard commercial Ceylon rubber containing less than 3% of resin.

I have discovered that in making the various products included in my present invention, observance of the following precautions will ensure successful results.

My general rule is that the minimum amount of the asbestos that will provide proper nuclei for a given amount of condensation product is two parts by weight of the asbestos for one part of the condensation product, but for many purposes, I prefer that the proportion be somewhat greater than this, say about $2\frac{1}{4}$ to $2\frac{1}{2}$ parts asbestos to one part condensation product.

My general rule is that the proportion of condensation product to rubber should not exceed 30% by weight of condensation product to 70% of rubber. For my rigid products such as switch board panels, I prefer that it be somewhere near the maximum or say 20% to 30% condensation product for 80% to 70% rubber. For my tough pliable products such as gaskets or leather substitutes, I prefer that it be somewhere near one-third of the maximum or say 8% to 11% of condensation product for 92% to 89% of rubber.

My general rule is that the amount of sulphur separately mixed with the rubber is much less than would be suggested by any rules for sulphur vulcanization and should be just enough to combine with the rubber and in any event the sulphur remaining uncombined in the finished product should not exceed 1%. To this end I prefer that for the rigid products the sulphur be say 8% to 11% of the rubber-sulphur mixture, and for the tough pliable products say 2 to 3% of the rubber-sulphur mixture. For the pliable products the percentage of sulphur may be increased to considerably more than 3% for the purpose of shortening the time of heating necessary to complete the reaction but this will give a somewhat harder product. Increasing sulphur much beyond 4% or 5% will make the material less stable and more likely to become brittle with use or lapse of time, unless the condensation product be correspondingly increased and such increase cannot be carried very far before the product will be lacking in pliability. The sulphur may also be decreased to say 1% but this greatly lengthens the time required for the heat treatment thereby increasing the expense of manufacture. As before stated, the sulphur must be intimately mixed with the rubber before being associated with the condensation product.

My general rule is that the binder may be mixed with the inert filler in any desired proportions, subject to the limitation that not less than 6% of the rubber-condensation product is desirable to properly hold and protect the inert filler, but even for the rigid products I prefer 10% to 20% of binder and for the pliable products, I may use about 20% to 40% of binder, the mica used as the filler, taken with the asbestos used as nuclei, being in the latter case approximately 60% to 80% of the total binder and filler.

The products having equal percentages of binder the hardness will depend on how much of the binder is condensation product and also on how much sulphur is used.

As defining the limits of my invention, it will be noted that theoretically, at least, there is no lower limit, the invention being practiced in some degree whenever condensation product in the primary or sensitive stage is caused to unite with rubber or its equivalent in the presence of sulphur or its equivalent. Hence, in practice, the lower limit of the invention is where the percentages of the condensation product and sulphur become too small to produce useful effects on the rubber. The upper limit can be more or less approximately indicated, however, because where the amount of condensation product or of sulphur is excessively out of proportion to the amount of rubber, the product should be considered as one in which the excess condensation product or the excess sulphur is present as a filler or adulterant, physically incorporated with my rubber-sulphur-condensation-product composition.

So far as my investigations show, the limitations for the rigid products such as are adapted for switchboard panels, etc. seem to be about as follows:

(a) The condensation product should be less than one-half the weight of the rubber.

(b) The nuclei should be more than twice the weight of the condensation product.

(c) The sulphur should be less than one-third the weight of the condensation product and hence less than one-sixth the weight of the rubber.

This may be tabulated in pounds weight as follows:

Rubber _____ 12 pounds
Sulphur (less than) _____ 2 pounds
Condensation product (less than) 6 pounds Total_____ 20 pounds The following is an illustrative example of a good formula for the rigid product which I have found to be safely within the above limits.

Rubber _____ 11. %
Sulphur _____ 1. %
Condensation product_____ 3.9%
Nuclei_____ 9.1%
Filler _____ 75. %

100. %

In the above formula, it will be noted that the sulphur is 8.33% of the rubber-sulphur mixture, the condensation product is 26.17 per cent of the rubber-condensation product constituting the binder, the binding material including the rubber and condensation product is 15.55% of the total binder and inert materials, while the inert materials including asbestos nuclei and mica filler are 84.1% of the total mixture.

The following is an illustrative example of a formula for a mixture of rubber, sulphur, condensation product and nuclei particularly adapted for use in producing flexible pliable or moldable products having the toughness suitable for various industrial purposes according to what amounts and kinds of filler is incorporated therewith.

Rubber_____ 72.13%
Sulphur_____ 1.64%
Condensation product_____ 7.87%
Nuclei_____ 18.36%

Such binder mixture is particularly suitable for making tough, pliable products and for having mixed into it any desired kind and quantity of filler. There should be, however, not less than 6% of the rubber-condensation product binder in order to properly hold and protect the filling material and 10% to 15% will usually be much better, while for certain purposes, 25% up to say 60% or more, may be used.

The filler may be widely varied to suit the particular use in view, as for instance, for insulating products, non-conducting substances, such as mica, preferably clina mica; for products which need not or should not be of such high insulating quality, conducting substances such as graphite or aluminum powders; for leather substitutes, material containing fibres, etc.

My above described compound with its various important chemical, electrical and mechanical qualities may be produced in various physical conditions and whether applied as a paint and subsequently vulcanized, or made up in solid sheets or articles, its flexiblity and hardness may be varied to suit any desired conditions of use by varying the condensation product, the sulphur and the heat treatment in a manner analogous to the ordinary principles of vulcanizing, and by varying the amount of inert filler employed. Such variations, however, should be within the limits above described.

The following is an illustrative example of a complete formula for tough, pliable products, the particular substance used as filler being especially adapted for making gaskets embodying the dielectric, alkali and acid resisting and other qualities desirable for electrolytic cells, batteries, etc.

| | |
|---|---|
| Ceylon rubber | 22. % |
| Sulphur | .5% |
| Asbestos (for nuclei) | 5.6% |
| Cresol condensation product | 2.4% |
| Clina mica (filler) | 69.5% |

In this formula the sulphur is 2.22% of the rubber-sulphur, the condensation product is 9.84% of rubber condensation product, the binding material including rubber and condensation product is 24.4% of the whole, and the inert materials including asbestos nuclei and mica filler are 75.1 of the total.

Certain other variations, substitutions, omissions or additions of constituent materials may be made to facilitate manufacture or to adapt the product for other uses, and these may involve certain advantages or disadvantages as where conducting or partly conducting material is substituted for non-conducting filler, or there may be both advantage and disadvantage according to the view-point or purpose. For instance, a somewhat softer material of somewhat less insulating quality may be made according to the following formula.

| | |
|---|---|
| Ceylon rubber | 26. % |
| Sulphur | .5% |
| Asbestos (nuclei) | 7. % |
| Cresol condensation product | 3. % |
| Litharge | 6. % |
| Clina mica (filler) | 57.5% |

In this formula the sulphur is 1.89% of the rubber-sulphur, the condensation product is 10.34% of the rubber-condensation product binder, the binding material including rubber and condensation product is 29% of the whole and the inert materials including asbestos nuclei and mica filler are 64.5% of the total.

It will be noted that the sulphur is only 1.89% of the rubber sulphur mixture as against 2.22% in the illustrative formula previously given. One reason for thus decreasing the sulphur is that the 6% of litharge acts to accelerate the reaction, its function being apparently that of a catalyzer which facilitates the action of the sulphur in attacking the rubber and opening the way for the condensation product to combine with the rubber. The litharge also is partly responsible for the material having less perfect insulating qualities.

Illustrative examples of three complete formulæ for pliable products suitable for steam packing and similar purposes, are combined in the following table in which the first column illustrates the use of powdered graphite; and the last two the use of powdered aluminum, as substitutes for part of the filler. The third column also illustrates how the rubber-sulphur percentage may be decreased and red lead introduced for high temperature steam packing.

| | | | | |
|---|---|---|---|---|
| Rubber-sulphur | Rubber | 22.0% | 22.0% | 11.0% |
| | Sulphur | 1.0% | 1.0% | 0.5% |
| Condensation product | Condensation product | 2.5% | 2.5% | 1.2% |
| | Nuclei asbestos | 5.8% | 5.8% | 2.9% |
| Filler | Mica | 54.0% | 45.0% | 12.0% |
| | Asbestos | | 10.0% | 55.5% |
| | Graphite | 8.7% | 0.2% | |
| | Aluminum | | 7.5% | 6.4% |
| Accelerator | Litharge | 6.0% | 6.0% | 8.0% |
| | Red lead | | | 2.5% |

It will be noted that for different kinds of steam packing a certain degree of heat conductivity afforded by aluminum powder, or lubrication afforded by graphite, or non-combustibility and ability to resist very high temperatures afforded by the third formula may be important. For lubrication the graphite may be substituted for other filler up to 40% or 50% or more in any of the above formulæ.

Illustrative examples of four complete formulæ for tough, pliable products suitable for use as sole leather substitutes, in black, tan, white and chrome respectively, are set forth in the columns of the following table:

| | | Black. | Tan. | White. | Chrome. |
|---|---|---|---|---|---|
| Rubber-sulphur | Rubber: Para | 23.8 | 23.8 | | |
| | Ceylon | | | 23.8 | 23.8 |
| | Sulphur | 1.1 | 1.1 | 1.1 | 1.1 |
| Condensation product | Condensation product | 2.6 | 2.6 | 2.6 | 2.6 |
| | Nuclei asbestos | 6.1 | 6.1 | 6.1 | 6.1 |
| Mineral filler | Magnesium oxide | | | 3.1 | |
| | Talc | | 16.0 | 36.0 | 21.0 |
| | Clina mica | 42.0 | 25.0 | | 12.5 |
| Organic filler | Cotton shoddy | 17.5 (light) | 17.5 (white) | 18.1 | 18.1 (white) |
| | Hair | | | | 3.8 (rabbit) |
| Coloring matter | Ground cork | | 0.5 | 0.5 | |
| | Lampblack | 1.7 | | | |
| | Raw sienna | | 2.3 | | |
| | Lead carbonate | | | 3.7 | |
| | Calcium oxide | | | 5.0 | 3.0 |
| Accelerator | Litharge | 5.2 | 5.1 | | |
| | Chromic oxide | | | | 8.0 |

For any of these products the steps to be followed are more or less similar. The condensation product, in one of its primary states, is first thoroughly mixed with and coated on to the nuclei, preferably short fibre asbestos and then spread out and allowed to harden without however changing it over to the final insoluble, non-reactive, infusible form. It is then comminuted or pulverized in any suitable way.

By a separate process the rubber and sulphur are molded together into intimate mixture, preferably by repeated folding and passing through warm rolls (preferably about 100° F.) until the sulphur becomes invisible (probably in solution) in the rubber.

The coated material in a dry state is incorporated into the rubber-sulphur mixture preferably by rolling and folding together until no layers or surfaces of separation appear and the mass is of uniform color and consistency throughout.

The material thus formed is relatively soft and moldable and the filler is added gradually while the material is being repeatedly rolled, folded and re-rolled. This process is continued until the material becomes perfectly homogeneous and of reddish brown color throughout.

The material is then cut to proper size and shape, put in the mold and subjected to hydraulic pressure of say 2000 pounds per square inch, the mold being heated preferably by steam at about 21 pounds pressure, that is to say, preferably about 260° Fahrenheit.

The heat of the mold may be varied considerably but too little heat will make the reaction slow or incomplete while too much heat too suddenly applied may make the product too hard or brittle and excessive heat may burn the rubber.

Where the condensation product is derived from commercial cresols, the reaction will begin somewhat below 260° Fahrenheit, and will be completed at temperatures somewhat higher probably because commercial cresol is usually a mixture of ortho-, meta- and para-cresol but, for phenol condensation product the temperature is more definite and the reaction more sudden when that temperature is reached. For my rigid products the heat may be raised considerably beyond the critical temperature required for the reaction, that is to say 290° or 300° F.

The closeness of grain of the product will be governed to a certain extent by the amount of the pressure exerted upon the material in the mold, the grain being closer where great pressure is used.

When the above specified heat and pressure are employed, the mold may be brought to heat in about 3 or 4 minutes and this heat and pressure continued for a sufficient time to complete the reaction. For the tough pliable products, say half an hour on the average, will be sufficient. The material expands slightly while the reaction resulting in combination of the condensation product with the rubber is taking place and the process will be complete a short time after the material has ceased to expand.

The completeness of the reaction may be determined by the change in color of the material, this being quite marked and easily recognized in practice but not so easy to describe. In general, it may be said that the raw material approximates a reddish brown while the finished product is more nearly an olive gray.

The resulting product may be either very rigid and of great structural strength or may be very tough, pliable and more like leather than rubber according to which formula is used, or a composite product may be produced combining different mixtures either in layers or otherwise and either before or after the heat treatment. Any of these products may have the above described desirable qualities of chemical inertness, stability and resistance to heat, together with insulating quality or conducting quality as the case may be.

If the pliable product formulæ specifying .5% for the sulphur, have the sulphur increased from .5% up to say 1.2% of the total mixture (=5.27% of the rubber sulphur mixture) the time required to complete the reaction may be decreased to about 20 minutes but the final product will be less pliable and though usable for many purposes, is more liable to deteriorate and become brittle, especially where the use is such as to expose to heat pressure and active chemical agents. If the sulphur be decreased to say .2% of the total mixture (that is somewhat less than 1% of the rubber-sulphur mixture) the product will be softer and the time of heating required for complete reaction will be very much prolonged.

The following is an illustrative example of how the principles of my invention may be applied for producing the binder in liquid form suitable for painting or coating upon articles which may be then dried and heat-treated to produce the typical reaction combining the constituent materials. One of the simplest ways is to prepare a binding material according to the previously given formula.—

| | |
|---|---|
| Rubber | 72.13% |
| Sulphur | 1.64% |
| Condensation product | 7.87% |
| Nuclei | 13.36% |

Such binder mixture prepared as heretofore prescribed is then dissolved in acetone, amylacetate, turpentine, ether, benz-aldehyde or other suitable liquid of the kinds which are solvents both for rubber and for the condensation product in the primary state. The phenols, or the formaldehyde from which the condensation product is made are also liquids which could be utilized for this purpose.

When made according to the above formula the inert nucleus material will of course settle out of the liquid and may be separated therefrom. The loss of this constituent at this stage of the process will do no harm. It has served its function of distributing and spreading the condensation product during the mixing and dissolving and thereafter the liquid solution serves an equivalent or analogous purpose.

In this connection and as bearing on the scope of my broad invention, attention is called to the fact that film coating on inert nuclei is not the only method of associating the condensation product with the rubber-sulphur in such manner as not to permit an excess concentration of condensation product as any one point in the mixture, since liquids may be employed in a manner which will bring about an analogous result. According to the liquid method, the rubber-sulphur is first thoroughly and separately mixtd as before and is then separately dissolved in a separate body of one of the above described liquid solvents. The condensation product is also separately prepared as before and is then separately dissolved in another body of liquid solvent. The two liquids may then be mixed, thus associating the condensation product with the rubber-sulphur, under conditions where both constitutents in such state of uniform diffusing as will avoid endangering the success of the further steps of the process.

The rubber-sulphur and the condensation product may be dissolved in different kinds of liquids provided both liquids are suitable solvents for the substances and provided the liquids are miscible without introducing any objectionable reaction, as for instance, the rubber may be dissolved in turpentine or ether and the condensation product separately dissolved in acetone and the two solutions subsequently mixed.

In either case the resulting solution contains the essential constituents of the binder in such condition that evaporation of the liquid followed by heat treatment in accordance with the principles above explained, will produce the desired reaction resulting in one of the desirable new products contemplated by my invention. Hence such liquid may be used as a binder, and may have various materials mixed with it either before or during or after partial or complete evaporation of the liquid and such material may be solid filler of the above or other suitable kind.

In the compounded materials made under the present process, it is believed that the influence of the condensation product is to chemically modify the rubber or caoutchouc molecules, itself also becoming chemically modified. Whether union between the two takes place is hypothetical, but I am inclined to believe that there is a chemical union in addition to the chemical action. The reasons for this belief are:

1. The raw mixture is reddish brown in color, but the reaction changes the substance to an olive gray color.

2. These results may be produced by a degree and time of heat treatment wholly insufficient for changing the condensation product into its final infusible form.

3. The expansion and shrinkage of the mixture during the reaction are entirely different both in degree and causation from those characteristic of the rubber constituent or of the condensation product. For instance;

(a) In molding rubber, the rubber swells upon heating and overflows the mold, then, upon cooling, it contracts, the contraction in the case of pure rubber being about three-quarters of an inch to the foot and in the case of filled rubber about one-quarter of an inch to the foot.

(b) The condensation product acts in the same way, overflowing on heating and shrinking on cooling, though the amount of the shrinkage is not so extraordinarily large as in the case of rubber.

(c) As contrasted with this, my mixture swells only a very little upon heating, overflows scarcely at all, then, as the vulcanizing reaction progresses, and without cooling, it shrinks only a trace. The shrinkage is progressive during the raction and when the reaction is finished, no further shrinkage occurs upon cooling. For instance, for some large rectangular gaskets about three feet by four feet, the molds were made the exact size of the gasket. This would be entirely impossible in the case of rubber, bakelite or any other rubber-like gasket.

4. In the present case, the final product is very resistant and practically proof against destructive action of chemicals such as alkalies, acids and the like, the action of which is far more destructive on either rubber or on the condensation product, than on my product derived from the two substances by the above described method.

These facts indicate that the rubber binder constituent in my product is a new chemical compound in which the active affinity for deleterious substances which is so characteristic of the commercial forms of partially vulcanized rubber has been satisfied by a compound other than sulphur (as for instance, by condensation product) at the sacrifice of stretchability, to be sure, but retaining such degree of flexibility as may be desired for the purpose in view and with great improvement in toughness and other qualities. In this way I combine the advantages of chemical stability attainable by full vulcanization with sulphur as in hard rubber or ebonite, together with the physical qualities heretofore attainable only in the partially vulcanized easily deteriorating forms of rubber.

From the foregoing explanation of the chemical and physical results which I obtain, it will be evident that the term "condensation" product is employed herein merely as a convenient way of identifying a certain class of compounds having the above described peculiar chemical properties and reactions with reference to sulphur and rubber molecules in the presence of heat. The word "condensation" is used because in present commercial practice most of the compounds suitable for my purpose are obtainable by condensation through catalytic action.

While I have given illustrative examples of the inert materials, condensation product and binders which may be employed and also illustrative formulae showing constituent materials and their percentages, calculated to produce certain very desirable embodiments of my invention, it will be understood by those skilled in the art that various omissions and substitutions of constituent materials, as well as various changes in the proportions may be made without departing from the spirit of my invention.

As an aid to those skilled in the art I may note that in making such omissions and substitutions for the production of rubber compounds, not only of the above class but also new compounds having heretofore unknown qualities, some of which compounds I have produced and many others of which will doubtless be produced by myself and by others, I think it necessary to describe more particularly the principle or theory upon which this new disclosure is based. In so doing, I will refer to certain well known and more or less substantiated chemical theories, not because said theories are necessarily complete or correct, but because proceeding in accordance with those theories as if they were true will enable those skilled in the art to intelligently direct their steps toward securing the desired practical results.

Rubber products as coagulated from the sap or raw rubber, are of a relatively stable character as against the natural elements and most of the weaker chemical reagents such as they are likely to come in contact with under ordinary use. The uses of pure rubber are limited in some instances because of its stickiness, plasticity, lack of physical strength and its solubility in certain solvents to which special uses may expose it, and in others because of the expense of using a pure product. According to present practice, the hardening is more usually accomplished by partial vulcanizing, usually by the addition of sulphur or other polymerizing agent, and the application of heat, the degree of hardening and other physical qualities of the product being dependent within limits upon the amount of sulphur employed and the degree and duration of the heat applied.

The difficulty with ordinary vulcanizing is that the product is never really stable until vulcanization has been carried to its limit, as for instance, in the production of ebonite. The excess of sulphur which is always employed over and above the amount necessary for chemically combining with rubber to produce the stage of vulcanization desired, is apt to react with the rubber, or, in other words, to carry the vulcanization further. Products in any of the intermediate stages or degrees of vulcanization are unsaturated and have an affinity for a large number of very common reagents to which they are ordinarily exposed by the conditions of use. Almost without exception, these reagents are destructive, tending to change the product either toward the brittle or frail condition when the reaction is oxidizing or dehydrating and toward the plastic or liquefied condition when the reaction is reducing or hydrogenating. In either case the elasticity and tensile strength are destroyed and the material rendered useless for most of the purposes for which it is commonly employed.

My invention contemplates employing sufficient vulcanizing agent to induce the active affinity stage but not sufficient to satisfy it, and simultaneously supplying to the rubber some other substance which while satisfying such active affinity, will not destroy the desirable physical qualities and which may in certain cases improve certain qualities or introduce new qualities. This generic feature of my process is applicable to the entire range of rubber compounds including those having most diverse physical characteristics, and make it possible to produce saturated, chemically resistent and therefore durable rubber having any desired degree of elasticity, pliability, toughness or hardness which could be approximated by any of the ordinary rubber vulcanization processes and in certain cases to produce other results heretofore unattainable.

A well known theory of the rubber molecule which will be found very useful in working out specific embodiments of my broad invention, is that the molecule ($C_{10}H_{16}$ molecular weight 136) is a ring structure in which eight of the carbon atoms are bonded together in an endless chain or ring, two pairs of the carbon atoms at diametrically opposite points in the ring being joined by double bonds, one of which may be readily opened for chemical union with a sulphur atom or other atom or group of atoms for which it has affinity.

Assumed that in elastic rubber, these ring molecules are molecularly associated in helical spring like formations and where the rubber is very pure and very elastic the number of molecules so joined is about twenty. Suppose molecular union to be between the double bonded carbon atoms located at the diametrically opposite points of the molecule structure.

The theory is that in vulcanization the heat causes an atom of sulphur or similar material to attack and satisfy one of the double bonds of the double bonded carbon atoms of the rubber molecule. The end molecules of the spiral structures are more exposed and more readily enter into such combination but if there is sulphur enough and heat enough, the spirals will be progressively broken up until all of the double bonded carbon atoms are exposed and a sulphur atom inserted into one bond of each pair.

The following facts fit into this theory.

(a) The amount of sulphur necessary to satisfy both of the double bonded pairs of carbon atoms of the rubber molecule is about 50% and it is a fact that 50% of sulphur must be used to give full permanent vulcanization, i. e., "hard rubber" or "ebonite."

(b) The use of only 5% to 10% vulcanizes it only enough to make it commercially useable and does not destroy its characteristic stretchability and resilience.

(c) My proportion of sulphur to rubber need not be more than 1% to 3% for the tough pliable product nor more than 5% to 7% for the rigid products. Nevertheless, in my compounds the plasticity and stretchability are largely replaced by toughness and either pliability or rigidity according to how much condensation product is used and how completely the process is carried out.

(d) Obviously these results obtainable with not more than 5% to 7% of sulphur cannot be the result of sulphur vulcanization, the tough rigid product particularly being one which could be approximated only by the use of 50% of sulphur.

(e) Finally, I have so far been unable to obtain my new product by direct union of rubber and condensation product, without the employment of sulphur or its equivalent.

These facts tend to prove that in my formulæ, the sulphur acts as a catalyzer, one atom of sulphur acting to open one bond of one pair of the double bonded carbon atoms of the rubber molecule and being then replaced by a molecule of the condensation product.

This is a specific statement of the broader proposition that small amounts of sulphur will have the effect of exciting or creating in rubber an affinity for many desirable reagents producing desirable results, which will not unite with the rubber directly, may be made to do so by bringing such reagent into intimate relation with unvulcanized rubber and uncombined sulphur at a vulcanizing heat under such conditions that the instant the sulphur opens one of the double carbon bonds, the desirable reagent may immediately slip in and take its place.

I have discovered that the necessary intimacy of relation and the desired reaction may be secured in the case of condensation products, by spreading the latter in a thin film or inert nuclei, and separately and intimately mixing the free sulphur with unvulcanized rubber before intimately mixing the coated material with the rubber-sulphur mixture, or by dissolving the rubber-sulphur and the condensation product in separate bodies of suitable liquid and then mixing the liquids, but the resulting conditions and the desired reactions are much more important than either of these specific ways of ensuring them, no matter how convenient or necessary the latter may be.

In the case where the reagent is a condensation product, the union seems to join the most susceptible points of both substances and their affinities for each other are so great that there is less susceptibility for any outside affinity. Thus the two substances combined are more proof against outside reagents than either of them are when alone.

Following such hypotheses, my method may be practiced for introducing many other reagents into the compounded rubber, producing a great variety of compounded materials.

Among the materials or reagents so introduced may be enumerated anthracene, alizarine, anthraquinone, naphthalene, alpha or beta naphthol, etc. Other substances are camphor ($C_{10}H_{16}O$) menthol ($C_{10}H_{20}O$), and turpentine ($C_{10}H_{16}$).

I believe that I am the first to discover the possibility of utilizing relatively small percentages of sulphur or its equivalent to attack the double bonded carbon atoms of the rubber molecules as a means for introducing more desirable atomic groups or molecules or to do this by a continuous progressive action or under conditions where the degree and extent of the action can be controlled so as to produce a great number of desirable products suitable for a vast number of different industrial purposes.

I also believe that I am the first to discover any successful method of combining rubber with condensation products in the chemically active state as distinct from using condensation products in the insoluble, infusible state as mere inert fillers for rubber compositions.

I claim:

1. A material adapted to be hardened by heat, essential constituents of which are a vulcanizable gum material intimately mixed, first, with a vulcanizing agent and then with a comminuted inert substance having the particles thereof coated with primary or soluble reactive condensation product of the phenol-formaldehyde type.

2. A material adapted to be hardened by heat, consisting of a vulcanizable rubber constituent and a vulcanizing agent mixed with comminuted inert material having the particles thereof coated with a primary or soluble reactive cresol-formaldehyde condensation product.

3. A material adapted to be hardened by heat, essential constituents of which are a vulcanizable gum material intimately mixed with sulphur and having worked thereinto a comminuted inert substance having the particles thereof coated with a primary reactive condensation product of the phenol-formaldehyde type.

4. A material adapted to be hardened by heat, said material comprising vulcanizable rubber intimately mixed with sulphur, also a reactive condensation product of the phenol-formaldehyde type and comminuted material on which said condensation product is coated; said condensation product being less than half the weight of the rubber; the comminuted material being more than twice the weight of the condensation product; and the sulphur being less than one-third the weight of the condensation product and less than one-sixth the weight of the rubber.

5. A material adapted to be hardened by heat, essential constituents of which are a vulcanizable material and a comminuted inert substance having the particles thereof coated with a primary reactive condensation product of the phenol-formaldehyde type; the condensation product used for the coating material being not more than one-half by weight of the inert material coated thereby.

6. A material adapted to be hardened by heat, essential constituents of which are a vulcanizable gum material, a vulcanizing agent and a comminuted inert substance having the particles thereof coated with a reactive condensation product of the phenol-formaldehyde type; the condensation product used for the coating material being less than one-half by weight of the inert material coated thereby and less than one-half by weight of the vulcanizable material.

7. A material, essential constituents of which are a vulcanizable gum, a comminuted inert substance having the particles thereof coated with a reactive phenol-formaldehyde condensation product; the amount of the condensation product used for the coating material being not more than one-half by weight of the comminuted material coated thereby and not more than thirty per cent of the total rubber and condensation product constituting the binder.

8. A solid article containing inert non-conducting comminuted material having the particles thereof coated with a condensation product of the phenol-formaldehyde type, intimately mixed with a vulcanizable gum, sulphur, and an additional inert non-conducting filler; said mixture being vulcanized to form a solid article, the amount of free sulphur in the vulcanized product being less than one per cent; the condensation product used for the coating material being not more than one-half by weight of the inert material coated thereby.

9. A solid article containing inert non-conducting comminuted material having the particles thereof coated with a condensation product of the phenol-formaldehyde type, intimately mixed with a vulcanizable gum, sulphur, and an additional inert non-conducting filler; said mixture being vulcanized to form a solid article, the amount of free sulphur in the vulcanized product being less than one per cent.

10. A solid article containing inert non-conducting comminuted material having the particles thereof coated with a condensation product formed by reaction of formaldehyde with a chemical of the cresol-phenol class, intimately mixed with a vulcanizable gum, sulphur, and an additional inert non-conducting filler; said mixture being vulcanized to form a solid article; the amount of sulphur in the vulcanized product being less than ten per cent and the free sulphur less than one per cent; the amount of the condensation product used for the coating material being not more than one-half by weight of the comminuted material coated thereby and not more than thirty per cent of the total rubber and condensation product constituting the binder.

11. A solid article containing inert non-conducting comminuted material having the particles thereof coated with a primary condensation product of the phenol-formaldehyde type, intimately mixed with a vulcanizable gum, a vulcanizing agent, and an additional inert non-conducting filler; said mixture being vulcanized to form a solid article; the amount of sulphur being less than 11% and more than 1% of the rubber-sulphur; the amount of the condensation product used for the coating material being not more than one-half by weight of the comminuted material coated thereby and not more than thirty per cent of the total rubber and condensation product constituting the binder; and the inert non-conducting filler being not more than ninety-four per cent of the total final product.

12. The method of making rubber compounds, which consists in diffusing a condensation product to present an extended surface by mixing it with sufficient comminuted inert material so that it forms a thin coating thereon; separately mixing rubber with sulphur; mixing the coated material with the rubber-sulphur mixture to form a modified binding material; mixing such binding material with a desired quantity of inert filler; molding the latter mixture to proper shape and heat treating it to vulcanize it to the required hardness.

13. The method of making products containing rubber and a primary or soluble condensation product of the phenol formaldehyde type, which method consists in diffusing sulphur in intimate mixture with unvulcanized rubber and in another operation, separately diffusing the condensation product by another diffusing medium, intimately mixing the diffused condensation product and the rubber-sulphur; working the latter mixture into the desired physical form or condition; and finally applying heat to produce the reaction indicated by expansion and by changed color in the product, the condensation product being by weight less than one-half of the rubber.

14. The method of making products containing rubber and a primary or soluble condensation product of the phenol-formaldehyde type, which method consists in diffusing sulphur in intimate mixture with unvulcanized rubber and in another operation, separately diffusing the condensation product by another diffusing medium, intimately mixing the diffused condensation product and the rubber-sulphur; working the latter mixture into the desired physical form or condition; and finally applying heat to raise the temperature of said mixture sufficiently to produce the reaction indicated by expansion and by changed color in the product, the condensation product being by weight less than one-half of the rubber, the sulphur being by weight more than one-hundredth and less than one-sixth of the rubber and less than one-third of the condensation product.

15. The method which consists in attacking rubber by a vulcanizing agent, and then uniting phenol-aldehyde condensation product with the rubber.

16. A rigid product containing a binder and filler, the binder consisting of rubber intimately mixed with sulphur and a condensation product of the phenol formaldehyde type, coated on inert nuclei, dried, comminuted and intimately mixed with the rubber while the condensation product is still in the primary or soluble state, and the resulting binder mixture being mixed with the filler, subjected to pressure and its temperature raised to produce the reaction indicated by expansion and change of color of the product.

17. A rigid product containing a binder and filler, the binder consisting of rubber intimately mixed with sulphur and a condensation product of the phenol-formaldehyde type, coated on inert nuclei, dried, comminuted and intimately mixed with the rubber while the condensation product is still in the primary or soluble state, and the resulting binder mixture being mixed with the filler, subjected to pressure and its temperature raised to produce the reaction indicated by expansion and change of color of the product, the sulphur being between 8% and 11% of the rubber-sulphur mixture, the condensation product being between 20% and 30% of the rubber condensation product, the rubber-condensation product being between 6% and 20% of the total binder and filler and the nuclei being more than 70% of the coated material.

18. As an article of manufacture, a rigid, tough insulator of high dielectric quality comprising a nonconducting filler of asbestos and mica and a non-conducting binder therefor, the binder containing rubber, sulphur and condensation product of the phenol-formaldehyde type, the sulphur being 8% to 11% of the rubber-sulphur; the condensation product being 20% to 30% of the rubber-condensation product, the asbestos being 2 to 2½ times the condensation product, and the total filler including asbestos and mica 80% to 94% of the total binder and filler.

19. A hard filled-rubber containing sulphur and condensation product having physical rigidity and structural strength, chemical inertness and stability and electrical insulating qualities similar to those of sulphur vulcanized hard rubber but having a sulphur content less than one-sixth the rubber and sulphur.

20. A hard filled-rubber product having physical rigidity and structural strength, chemical inertness and stability and electrical insulating qualities similar to those of sulphur vulcanized hard rubber but having a sulphur content less than one-sixth the rubber-sulphur together with a condensation product of the phenol-formaldehyde type constituting 20% to 30% of the rubber-condensation product content.

Signed at New York city in the county of New York, and State of New York this 21st day of June, A. D. 1918.

EDWARD O. BENJAMIN.